US009029745B2

(12) United States Patent
Maiden

(10) Patent No.: US 9,029,745 B2
(45) Date of Patent: May 12, 2015

(54) METHOD AND APPARATUS FOR PROVIDING IMAGE DATA

(75) Inventor: Andrew Maiden, Sheffield (GB)

(73) Assignee: Phase Focus Limited, Sheffield South Yorkshire (GB)

(*) Notice: Subject to any disclaimer, the term of this patent is extended or adjusted under 35 U.S.C. 154(b) by 166 days.

(21) Appl. No.: 13/991,233

(22) PCT Filed: Dec. 2, 2011

(86) PCT No.: PCT/GB2011/052392
§ 371 (c)(1),
(2), (4) Date: Jun. 3, 2013

(87) PCT Pub. No.: WO2012/073043
PCT Pub. Date: Jun. 7, 2012

(65) Prior Publication Data
US 2013/0256503 A1 Oct. 3, 2013

(30) Foreign Application Priority Data
Dec. 3, 2010 (GB) .................................. 1020516.9

(51) Int. Cl.
G01J 1/20 (2006.01)
G01J 1/42 (2006.01)
G06T 15/00 (2011.01)
G06T 7/00 (2006.01)
G01T 1/29 (2006.01)

(52) U.S. Cl.
CPC . *G01J 1/42* (2013.01); *G06T 15/00* (2013.01); *G06T 7/00* (2013.01); *G01T 1/29* (2013.01)

(58) Field of Classification Search
CPC .................................. G06T 7/00; G06T 15/00
USPC ............... 250/201.9, 206, 216, 214 R, 214 C;
345/419, 420; 382/103, 154, 312; 702/167
See application file for complete search history.

(56) References Cited

U.S. PATENT DOCUMENTS

2003/0202634 A1   10/2003   Gerchberg
2013/0092816 A1*   4/2013   Barrett et al. ............... 250/201.9
2013/0181990 A1*   7/2013   Rodenburg et al. ........... 345/420

FOREIGN PATENT DOCUMENTS

GB    2403616 A      1/2005
WO    2005106531 A1  11/2005

(Continued)

OTHER PUBLICATIONS

Ex. Athina Nickitas-Etienne, "International Bureau's Notification Concerning Transmittal of the International Preliminary Report on Patentability, International Preliminary Report on Patentability" dated Jun. 13, 2013, from International Application No. PCT/GB2011/052392 filed Dec. 2, 2011, pp. 1-7.

(Continued)

*Primary Examiner* — Kevin Pyo
(74) *Attorney, Agent, or Firm* — MH2 Technology Law Group, LLP

(57) ABSTRACT

Embodiments of the present invention provide a method of providing image data for constructing an image of a region of a target object (40) comprising providing incident radiation from a radiation source at a target object (40); detecting, by at least one detector (50), a portion of radiation scattered by the target object; and providing image data via an iterative process responsive to the detected radiation (340), wherein said iterative process comprises estimating a wave front of scattered radiation at a plane of the detector, updating a portion of the wave front based on the detected radiation, leaving a portion of the estimated wave front substantially unchanged, setting a portion of the wave front, corresponding to a portion of radiation scattered by the target object and not detected by the detector, to one or more values, and providing image data based upon the updated wave front.

30 Claims, 5 Drawing Sheets

(56) References Cited

FOREIGN PATENT DOCUMENTS

| WO | 2010035033 A1 | 4/2010 |
|---|---|---|
| WO | 2010064051 A1 | 6/2010 |
| WO | 2010119278 A1 | 10/2010 |
| WO | 2011033287 A1 | 3/2011 |

OTHER PUBLICATIONS

Ex. Katja Eberle, "International Search Report" dated Jun. 13, 2013 from International Application No. PCT/GB2011/052392, pp. 1-5.
Ex. Peter Davies, "Intellectual Property Office Search Report" dated Apr. 12, 2011, from UK Priority Application No. GB1020516.9, pp. 1-4.

Faulkner, H.M.L. et al., "Error tolerance of an iterative phase retrieval algorithm for moveable illumination microscopy", Ultramicroscopy, Elsevier, Amsterdam, NL, vol. 103, No. 2, dated May 1, 2005, pp. 153-164.
Maiden, A.M. et al., "An improved ptychographical phase retrieval algoritm for diffractive imaging", Ultramicroscopy, Elsevier, Amsterdam, NL, vol. 109, No. 10, dated Sep. 1, 2009, pp. 1256-1262.
Maiden, Andrew M. et al., "Superresolution imaging via ptychography", Journal of the Optical Society of America A, vol. 28, No. 4, dated Apr. 1, 2011, pp. 604-612.
Gerchberg, R.W., "Super-resolution through error energy reduction", Optica Acta, vol. 21, No. 9, dated Jan. 15, 1974, pp. 709-720.
Guizar-Sicairos, Manuel et al., "Phase retrieval with Fourier-weighted projections", J. Opt. Soc. Am. A, vol. 25, No. 3, dated Mar. 9, 2008, pp. 701-709.

\* cited by examiner

METHOD AND APPARATUS FOR PROVIDING IMAGE DATA

CROSS-REFERENCE TO RELATED APPLICATIONS

This application is a U.S. National Stage of International Application No. PCT/GB2011/052392 filed 2 Dec. 2011 which claims priority to Great Britain patent application 1020516.9 filed 3 Dec. 2010, both of which are hereby incorporated herein by reference. This application is related to U.S. Application No. 13/310,129 filed 2 Dec. 2011, which is hereby incorporated by reference in its entirety.

BACKGROUND

The present invention relates to method and apparatus for providing image data from which an image of at least a portion of a target object may be generated.

WO 2005/106531, which is incorporated herein by reference for all purposes, discloses a method and apparatus of providing image data for constructing an image of a region of a target object. Incident radiation is provided from a radiation source at the target object. An intensity of radiation scattered by the target object is detected using at least one detector. The image data is provided responsive to the detected radiation. A method for providing such image data via an iterative process using a movable softly varying probe function such as a transmittance function or illumination function is also disclosed. The methods and techniques disclosed in WO 2005/106531 are referred to as a ptychographical iterative engine (PIE).

PIE provides for the recovery of image data relating to at least an area of a target object from a set of diffraction pattern measurements. Several diffraction patterns are recorded at a measurement plane using one or more detectors, such as a CCD or the like. A probe function, which might be a transmittance function associated with a post-target object aperture or an illumination function, must be known or estimated.

WO 2010/064051, which is incorporated herein by reference for all purposes, discloses an enhanced PIE (ePIE) method wherein it is not necessary to know or estimate the probe function. Instead a process is disclosed in which the probe function is iteratively calculated step by step with a running estimate of the probe function being utilised to determine running estimates of an object function associated with a target object.

Other methods of providing image data based on measurement of scattered radiation are also known.

It is an object of embodiments of the invention to at least mitigate one or more of the problems of the prior art.

SUMMARY OF THE INVENTION

According to aspects of the present invention there is provided methods and apparatus as set forth in the appended claims.

According to an aspect of the invention there is provided a method of providing image data for constructing an image of a region of a target object, comprising providing incident radiation from a radiation source at a target object; detecting, by at least one detector, a portion of radiation scattered by the target object; and providing image data via an iterative process responsive to the detected radiation, wherein said iterative process comprises estimating a wave front of scattered radiation at a plane of the detector, updating a portion of the wave front based on the detected radiation, leaving a portion of the estimated wave front substantially unchanged, setting a portion of the wave front, corresponding to a portion of radiation scattered by the target object and not detected by the detector, to one or more values, and providing image data based upon the updated wave front.

The detecting step may optionally comprise detecting a portion of radiation scattered by the target object with the incident radiation or an aperture at first and second positions. Further positions of the aperture or incident radiation may be utilised.

The portion of the estimated wave front substantially unchanged may optionally be relatively larger than the portion of the wave front set to one or more values. Relatively larger may be at least the same size or in some embodiments a predetermined number of times larger. The predetermined number of times may be at least twice as large or at least four times as large. That is, the area of the estimated wave front set to one or more values may be less than 50%, 25%, 10%, 5% or 1% of the area which is updated.

The portion updated based on the detected radiation may be around 5-15% of the total wave front. The portion of the estimated wave front substantially unchanged may be around 85-95% of the total wave front. The portion of the wave front set to one or more values may be around 5-0.5% of the total wave front. As an example, the area updated may be 6% of the total wave front, the area left unchanged may be 93% and the area set to one or more values may be around 1%, although it will be appreciated that other values may be chosen.

The one or more values may comprise predetermined values or values determined according to one or more functions.

The portion of the wave front corresponding to the portion of radiation scattered by the target object and not detected by the detector may be a peripheral region of at least a part of the wave front. The peripheral region extends a plurality of pixels into the wave front. The plurality of pixels may be 1, 2, 8 or 16 pixels. The plurality may be less than 16 pixels.

According to another aspect of the present invention there is provided a method of providing image data for constructing an image of a region of a target object, comprising providing incident radiation from a radiation source at a target object, detecting, by at least one detector, a portion of radiation scattered by the target object with the incident radiation or a post-target aperture at first and second positions, and providing image data via an iterative process responsive to the detected radiation, wherein in said iterative process image data is provided corresponding to a portion of radiation scattered by the target object and not detected by the detector.

Optionally, the method may comprise detecting an intensity of radiation scattered by the target object with the incident radiation or the post target aperture at the first position with respect to the target object; re-positioning the incident radiation or the post-target aperture at at least one further position relative to the target object; and subsequently detecting the intensity of radiation scattered by the target object with the incident radiation or post-target aperture at the at least one further position.

Optionally, the method may comprise: estimating an object function indicating at least one characteristic of said region of the target object; and/or estimating a probe function indicating at least one characteristic of incident radiation at the target object or the post-target aperture; and iteratively re-estimating each of the object function and/or probe function.

Optionally, the method may comprise multiplying the estimated object function by the estimated probe function to thereby provide an exit wave function; propagating the exit wave function to provide an estimate of an expected scattering pattern; and correcting at least one characteristic of said expected scattering pattern according to a detected intensity of radiation scattered by the target object.

Optionally, the method may comprise inverse propagating a corrected expected scattering pattern to thereby provide an updated exit wave function.

Optionally, the method may comprise propagating the estimated probe function to provide an estimate scattering pattern in a measurement plane of the detector where the propagation operator $\mathcal{T}$ suitably models the propagation between the plane of the object and the measurement plane. $\mathcal{T}$ may comprise a Fourier Transform or a Fresnel Transform.

Optionally, the method may comprise updating a running estimate of the probe function and/or a running estimate of an object function simultaneously with each iteration.

Optionally, the method may further comprise providing an initial estimate of the probe function as a prior modeled probe function. The initial estimate of the probe function may be provided by a random approximation for the probe function.

Optionally, wherein the target object may be at least partially transparent to the incident radiation and detecting an intensity of radiation scattered by the target object may comprise detecting an intensity of radiation transmitted by the target object.

Optionally, the target object may be at least partially reflective to the incident radiation and detecting an intensity of radiation scattered by the target object may comprise detecting an intensity of radiation reflected by the target object.

According to a still further aspect of the present invention there is provided an apparatus for providing image data for constructing an image of a region of a target object, comprising at least one detector for detecting an intensity of radiation scattered by the target object; and a processing means arranged to provide image data via an iterative process responsive to the detected radiation object with incident radiation or an aperture at first and second positions, wherein in said iterative process image data is provided corresponding to a portion of radiation scattered by the target object and not detected by the detector.

According to a yet further aspect of the present invention there is provided a computer program which, when executed by a computer, performs a method of providing image data for constructing an image of a region of a target object, comprising providing incident radiation from a radiation source at a target object, detecting, by at least one detector, a portion of radiation scattered by the target object with the incident radiation or an aperture at first and second positions, and providing image data via an iterative process responsive to the detected radiation, wherein in said iterative process image data is provided corresponding to a portion of radiation scattered by the target object and not detected by the detector. The computer program may be stored on a computer readable medium.

According to a yet further aspect of the present invention there is provided a computer program which, when executed by a computer, performs a method of providing image data for constructing an image of a region of a target object according to an aspect of the invention.

Embodiments of the invention provide image data having an improved resolution. Some embodiments of the invention improve a rate of convergence of a method of determining the image data. Some embodiments of the invention reduce a noise present in the image data.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1:
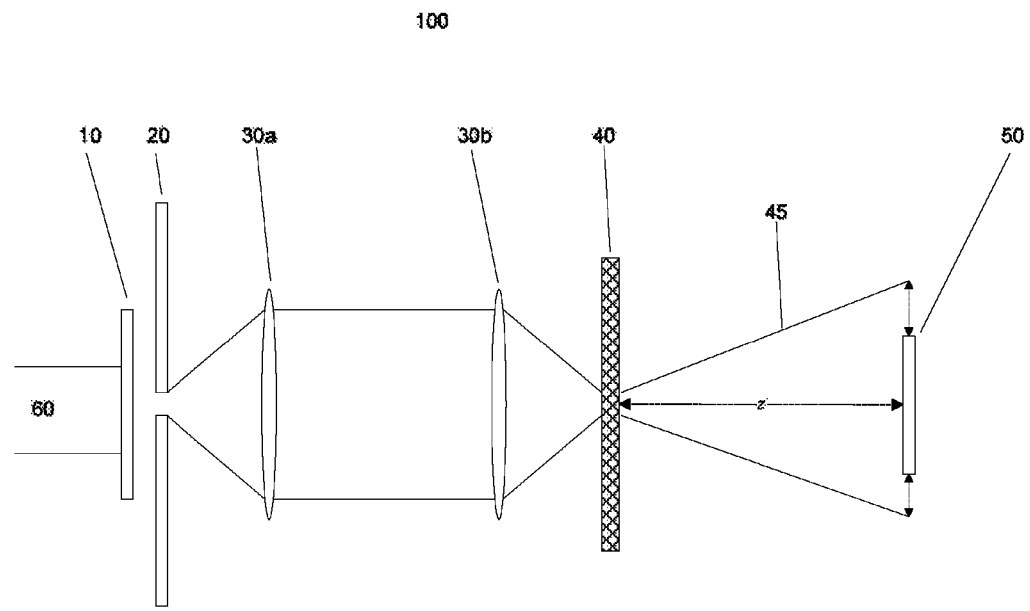
FIG. 1 shows an apparatus according to an embodiment of the invention.

FIG. 1 illustrates an apparatus 100 according to an embodiment of the invention. The apparatus is suitable to provide image data of an object which may, although not exclusively, be used to produce an image of at least a region of the object.

The apparatus 100 comprises a diffuser 10, an aperture 20, a pair of lenses 30a, 30b and a radiation detector 50 for detecting incident radiation.

A radiation source, which although not shown in FIG. 1, is a source of radiation 60 which falls upon the diffuser 10 and eventually illuminates a region of a target object 40. It is to be understood that the term radiation is to be broadly construed. The term radiation includes various wave fronts. Radiation includes energy from a radiation source. This will include electromagnetic radiation including X-rays, emitted particles such as electrons. Other types of radiation include acoustic radiation, such as sound waves. Such radiation may be represented by a wave function $\Psi(r)$. This wave function includes a real part and an imaginary part as will be understood by those skilled in the art. This may be represented by the wave function's modulus and phase. $\Psi(r)^*$ is the complex conjugate of $\Psi(r)$ and $\Psi(r) \Psi(r)^* = |\Psi(r)|^2$ where $|\Psi(r)|^2$ is an intensity which may be measured for the wave function.

The diffuser 10 is provided to introduce a range of phase gradients into the radiation 60 i.e. to randomise a phase of the radiation. The diffuser 10 may be formed from many materials. In some embodiments, the diffuser 10 may be formed by one or more layers of plastic film. A single layer of plastic film may be used as a weak diffuser, whilst two or more layers may be used to form a stronger diffuser. The diffuser 10 contributes to a spreading of a diffraction pattern beyond an extent of the detector 50, as will be explained. A distance z between the target object 40 and the detector 50 may thus depend on the strength of the diffuser 10. For example, for the weak diffuser a distance of z=86 mm may be used, whereas for the stronger diffuser a distance z=94.4 mm may be used, although it will be realised that these are merely exemplary distances. In the embodiments described with reference to FIG. 1, the diffuser 10 is located prior to, i.e. to be illuminated before, the probe 20. However, the diffuser 10 may be arranged in other alternative locations, such as following i.e. downstream of the probe 20, such as immediately adjacent the probe 20 or further downstream.

The inclusion of the diffuser 10 into the apparatus 100 also leads to a reduction in a dynamic range of a resultant diffraction pattern. As most detectors have a limited dynamic range, reducing the dynamic range of the diffraction pattern may allow a more faithful representation of the diffraction pattern to be determined. Furthermore, as the radiation incident on the sample 40 is spread more evenly over all diffraction angles, the incident flux required to provide the image data may be reduced, thereby reducing the possibility of causing damage to the target object 40.

Any type of diffuser 10 having an arbitrary transfer function may be used. As will be understood by the skilled person, the choice of diffuser will depend on the properties of the radiation used, and the desired diffusion effect. For example, for visible light the diffuser may comprise a ground glass diffuser.

It will also be realised that embodiments of the invention may also be envisaged which do not include the diffuser 10.

The aperture 20 together with the pair of lenses 30a, 30b in the embodiment shown in FIG. 1 form a probe which is arranged to illuminate a region of the target object 40. The lenses 30a, 30b shown in FIG. 1 are arranged in a 4f configuration. It will be realised that embodiments of the invention may be envisaged which do not include the pair of lenses 30a, 30b, include only one lens or include other arrangements of one or more lenses.

The illuminating radiation incident on the target object 40 represents a probe function P(r) which forms an illumination function. P(r) is the complex stationary value of this wave field calculated at the plane of the object 40.

It will be understood that rather than weakly (or indeed strongly) focusing illumination on the target 40, unfocused radiation can be used with a post target aperture. In this embodiment aperture is located post target object to thereby select a region of the target for investigation. The aperture is formed in a mask so that the aperture defines a "support". A support is an area of a function where that function is not zero. In other words outside the support the function is zero. Outside the support the mask blocks the transmittance of radiation. The term aperture describes a localised transmission function of radiation. This may be represented by a complex variable in two dimensions having a modulus value between 0 and 1. An example is a mask having a physical aperture region of varying transmittance.

Incident radiation thus falls upon the up-stream side of the target object 40 and is scattered by the target object 40 as it is transmitted. The target object 40 should be at least partially transparent to incident radiation. The target object 40 may or may not have some repetitive structure. Alternatively the target object 40 may be wholly or partially reflective in which case a scattering pattern is measured based on reflected radiation.

A wave is thus formed as an exit wave function of radiation after interaction with the object 40. O(r) represents a two-dimensional complex object/specimen function so that each point in O(r), where r is a two-dimensional coordinate, has associated with it a complex number. We assume that O(r) will physically represent an exit wave that would emanate from the object which is illuminated by a plane wave. For example, in the case of electron scattering, O(r) would represent the phase and amplitude alteration introduced into an incident wave as a result of passing through the object of interest. The aperture 20 provides a probe function P(r) (or transmission function) which selects a part of the object exit wave function for analysis. It will be understood that rather than selecting an aperture a transmission grating or other such filtering function may be located downstream of the object function. The probe function P(r−R) is an illumination wave or an aperture transmission function where the illumination wave or aperture is at a position R. The probe function can be represented as a complex function with its complex value given by a modulus and phase which represent the modulus and phase alterations introduced by the probe into a perfect plane wave incident up it. It will also be understood that both the probe and specimen functions may be three-dimensional complex functions, P(s) and O(s), so that each point in P(s) and O(s), where s is a three-dimensional coordinate, has associated with it a complex number.

The exit wave function ψ(r, R) is an exit wave function of radiation as it exits the object 40. This exit wave ψ(r, R) forms a diffraction pattern Ψ(u) at a diffraction plane. Here r is a vector coordinate in real space and u is a vector coordinate in diffraction space.

It will be understood that if the diffraction plane at which scattered radiation is detected is moved nearer to the specimen 40 then Fresnel diffraction patterns will be detected rather than Fourier diffraction patterns. In such a case the propagation function from the exit wave ψ(r, R) to the diffraction pattern Ψ(u) will be a Fresnel transform rather than a Fourier transform. It will also be understood that the propagation function from the exit wave ψ(r, R) to the diffraction pattern Ψ(u) may be modeled using other transforms.

In order to select the region of the target object 40 to be illuminated or probed, the aperture 20 and lenses 30a, 30b may be mounted upon an x/y translation stage which enables movement of the probe function with respect to the object 40. However, it will also be realised that the object 40 may be moved with respect to the probe function. The probe function may be moved by the translation stage in a grid arrangement of positions. The grid may comprise 20×20 positions, although other numbers of positions may be used and, furthermore, the grid may not comprise equal numbers of positions in both x and y directions. A random offset may be introduced into a location of each grid position. For example, if the grid positions have a pitch of 30 μm, the offset may be ±5 μm. Advantageously, this avoids problems associated with "raster grid pathology", as is appreciated by those skilled in the art.

The detector 50 is a suitable recording device such as a CCD camera or the like. The detector 50 allows the detection of the diffraction pattern in the diffraction plane. The detector may comprise an array of detector elements, such as in a CCD.

Figure 2:
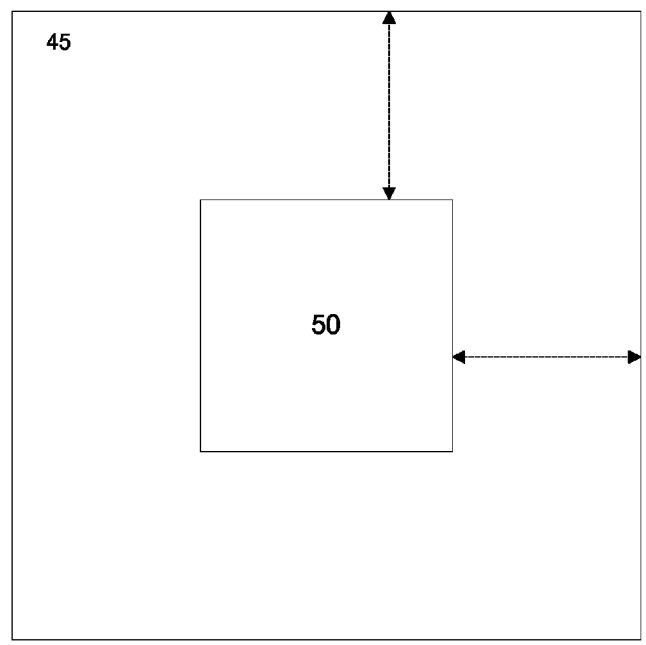
FIG. 2 shows a detector in relation to scattered radiation according to an embodiment of the invention.

In embodiments of the invention the apparatus 100 is arranged to cause the scattered radiation 45 to extend beyond the aperture of the detector 50 in the diffraction plane, as shown in FIGS. 1 and 2. Although FIG. 1 shows the extent of the scattered radiation 45 extending vertically beyond the detector 50, the radiation may also or alternatively extend horizontally beyond the detector 50, as shown in FIG. 2. As will be appreciated, some of the scattered radiation is not detected by the detector 50.

FIG. 2 schematically illustrates an extent of scattered radiation 45 in the diffraction plane and the aperture of the detector 50. The extent of the scattered radiation 45 beyond the aperture of the detector 50 is illustrated in FIG. 2 with dashed arrows. Whilst the scattered radiation 45 and detector 50 are shown as having a square cross-section, it will be realised that this is merely exemplary for the purposes of illustration and that other profiles, such as rounded, rectangular or non-regular shapes are envisaged. Furthermore, it is also contemplated that the radiation may not extend beyond a periphery of the detector 50. For example, the detector 50 may comprise a central region which does not record an intensity of the radiation. Thus, the detector 50 only records a diffraction pattern corresponding to a portion of the scattered radiation. An intensity of a portion of the scattered radiation is unrecorded by the detector 50. Embodiments of the present invention allow image data to be generated corresponding to the unrecorded radiation.

Figure 3:
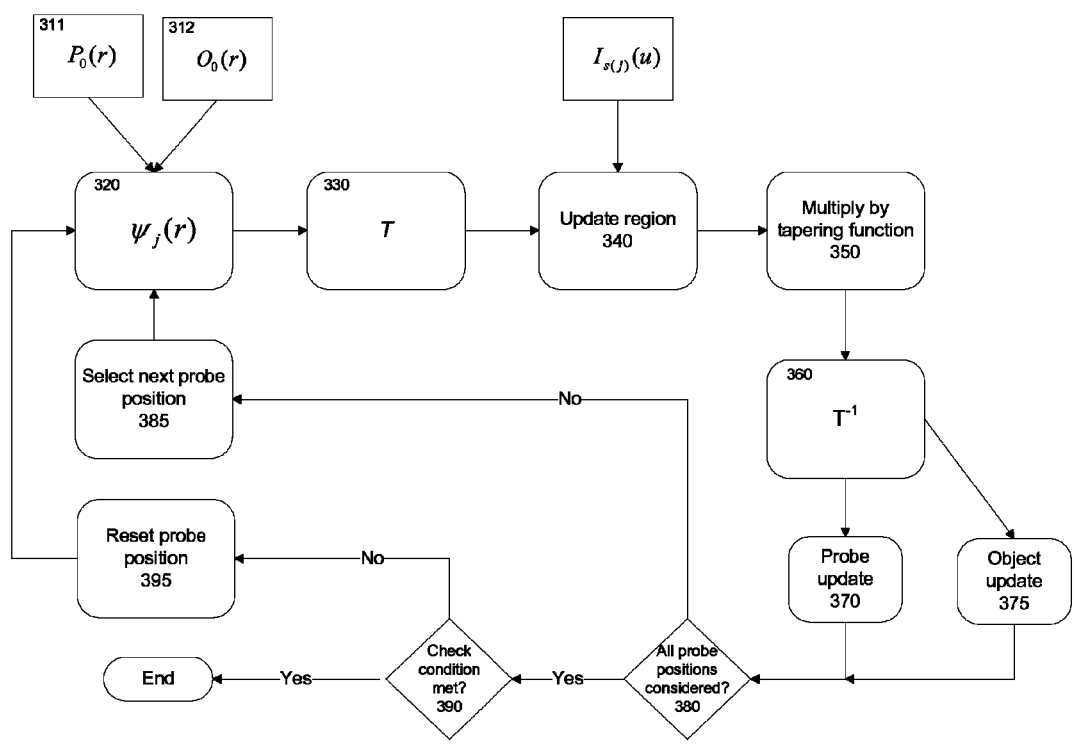
FIG. 3 shows a method according to an embodiment of the invention.

FIG. 3 illustrates a method according to an embodiment of the invention. The method illustrated in FIG. 3 involves simultaneous, step-by-step updating of both probe and object function estimates. However, it will also be realised that embodiments of the invention may be envisaged in which only the object function may be updated and a known probe function may be used, as in the methods and apparatus disclosed by WO 2005/106531, for example. Furthermore, in other embodiments of the invention, a known object function may be used and the method may determine the probe function. It will also be appreciated that the object function and/or probe function may be updated by other methods.

The method utilises a set s(j) of J diffracted intensities or diffraction patterns, $I_j(u)$, recorded by the detector 50, where $I_j(u)=|\Psi_j(u)|^2$ is the square of the modulus of the wave front incident upon the detector 50. Within each iteration of the method an estimate of the probe and object functions is updated for each of the J diffraction patterns measured by the detector 50. An order of considering each of the J measured intensities is chosen. The order may be numerically sequential i.e. j=1, 2, 3 . . . J. In this case, beginning with diffraction pattern s(j) and progressing through to s(J) updated estimates of the probe $P_1(r) \ldots P_J(r)$ and object $O_1(r) \ldots O_J(r)$ are produced. However, considering the diffraction patterns in a raster fashion (each pattern in a row sequentially and each row sequentially) may cause problems particularly in relation to the estimate of the probe function drifting during the method. Therefore, in some embodiments, the diffraction patterns may be considered in a random or other pseudo-random order. However, for the purposes of explanation, a sequential ordering of the set s(j) will be considered.

Prior to a first (k=1) iteration of the method, initial probe $P_0(r)$ 311 and object $O_0(r)$ 312 functions are selected. The initial probe and object functions 311, 312 may be predetermined initial values, such as initial guesses i.e. pre-calculated approximations, random distributions, or may be based on other initial measurements or prior calculations. The functions are modeled at a number of sample points and are thus represented by matrices. Such matrices can be stored and manipulated by a computer or other such processing unit. Aptly the sample points are equally spaced and form a rectangular array.

In step 320 an exit wave $\psi_j(r)$ is determined by multiplying the current object and probe functions. For the first (k=1) iteration of the method, for the first probe position s(1), the initial probe $P_0(r)$ and object functions $O_0(r)$ are multiplied to determine the first exit wave $\psi_1(r)$. For subsequent iterations of the method, the currently selected i.e. $O_j(r)P_j(r)$ are multiplied to determine the current exit wave $\psi_j(r)$.

In step 330 the exit wave $\psi_j(r)$ is propagated to a measurement plane of the detector 50. The propagation produces an estimate $\Psi_j(u)$ of the wavefront at the plane of the detector 50. The exit wave is propagated to the measurement plane by a suitable transform T, as shown in equation 1. In some embodiments, the transform T may be a Fourier transform, although in other embodiments the transform may be a Fresnel free space propagator. It is also envisaged that other transforms may be used which are suited to the particular application of the method.

$$\Psi_j(u)=T[\psi(r)]\qquad\text{Equation 1}$$

In step 340 a portion of the wavefront $\Psi_j(u)$ at the plane of the detector 50 is updated based on the measured diffraction pattern $I_{s(j)}(u)$. As explained in the cited references, since $\Psi_j(u)$ is a complex-value, it may be written as shown in equation 2:

$$\Psi_j(u)=A_j(u)\exp(i\phi_j(u))\qquad\text{Equation 2}$$

In some embodiments, the wavefront $\Psi_j(u)$ at the plane of the detector 50 may be considered to extend over cM×cN pixels where c is a constant value, for example c may equal 4 and the central M×N pixels correspond to the area of the detector 50. A modulus of this central region of the wavefront may be replaced with equation 3:

$$\sqrt{I_{s(j)}(u)}\qquad\text{Equation 3}$$

whilst the values of at least some of the remaining pixels or matrix positions are left unchanged. In other words, the values of at least some of the remaining matrix positions or pixels are allowed to "float".

In some embodiments, a step 350 includes multiplying values of predetermined pixels in $\Psi_j(u)$ by a tapering function. In some embodiments, the tapering function results in setting a value of a peripheral region of the diffraction pattern $\Psi_j(u)$. The value may be a predetermined value such as 0, although one or more other values may be envisaged, as will be explained. The tapering function prevents noise being introduced into the image data caused, in some embodiments, by Fourier repeats encroaching into the diffraction pattern.

Figure 4:
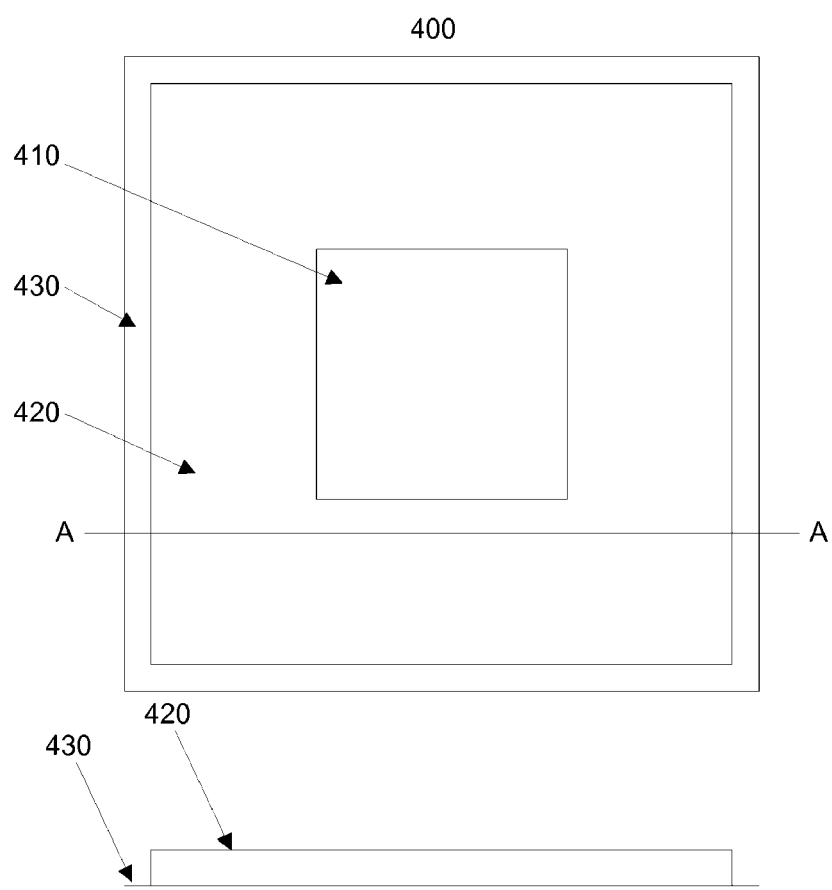
FIG. 4 illustrates a diffraction pattern according to an embodiment of the invention.

FIG. 4a illustrates the diffraction pattern $\Psi_j(u)$ denoted generally as 400. A central region 410 of the diffraction pattern is updated, as explained above, with reference to the measured diffraction pattern. A region 420 surrounding the updated region 410 is allowed to float i.e. these values are not updated. A further peripheral region 430 surrounding the floating region is clamped by being set to have one or more predetermined values, or values determined according to a predetermined function. The values may, in some embodiments, be between 0 and 1 i.e. an outer periphery of the region 430 may be set to 0, whilst inwardly extending pixels values may be set to values between 0 and 1 i.e. inwardly approaching 1. The values may approach 1 according to a predetermined function. The pixel values may approach 1 in a unidirectional manner i.e. continuously increasing, either linearly or non-linearly. Whilst values of 0 and 1 have been used, it is realised that these are merely exemplary. FIG. 4b illustrates a section through the diffraction pattern $\Psi_j(u)$ along line A-A in which the outer peripheral region is set to have a value of 0. Whilst the floating region 420 is illustrated as having a single constant value i.e. all pixels are set to the same value, such as 1, this is merely illustrative.

The width of the clamped region 430 may be chosen to reduce noise at the expense of the resolution of the image data. In some embodiments, the region 430 may inwardly extend by one pixel i.e. the border region 430 may be one pixel wide. However, in other embodiments, the region 430 may be more than one pixel wide, such as 8 or 16 pixels wide.

In step 360 the diffraction pattern $\Psi_j(u)$ is reverse propagated back to a plane of the object 40. The inverse propagation is performed according to the reverse of the transform used in step 330. In some embodiments, the transform used in step 360 is an inverse Fourier transform, although as previously explained other transforms may be used. The inverse transform is performed according to Equation 4:

$$\psi'_j(r)=T^{-1}[\Psi_j(u)]\qquad\text{Equation 4}$$

In steps 370 and 375 the probe and object function are updated. The updating provides an improved probe $P_{j+1}$ and object guess $O_{j+1}(r)$. The updating may be performed as described in the incorporated reference WO 201/064051, or by any other method. As described in WO 201/064051, the object function may be updated according to Equation 5 and the probe function according to Equation 6:

$$O_{j+1}(r) = Oj(r) + \alpha \frac{P_j^*(r)}{|P_j(r)|_{max}^2}(\psi'_j(r) - \psi_j(r))  \quad \text{Equation 5}$$

The parameter α governs the rate of change of the object guess. This value may be adjusted between 0 and 2 as higher values may lead to instability in the updated object guess. According to embodiments of the present invention the probe function is reconstructed in much the same manner as the object function. Aptly the probe function guess is carried out concurrently with the update of the object guess. (It will be appreciated that the probe Function could optionally be updated more often or less often than the object Function).

$$P_{j+1}(r) = P_j(r) + \beta \frac{O_j^*(r)}{|O_j(r)|_{max}^2}(\psi'_j(r) - \psi_j(r))  \quad \text{Equation 6}$$

The result of this update function generates the running estimate for the probe function. The parameter β governs the rate of change of the probe guess. This value may be adjusted between 0 and 2 as higher values may lead to instability in the updated probe guess.

In step 380 it is determined whether every probe position for the current iteration has been addressed. In other words, it is determined in some embodiments whether j=J. If the current probe position is not the last probe position of the current iteration, then the next probe position is selected. The next probe position may be selected in step 385 by j=j+1. However, if the current probe position is the last probe position for the current iteration, then the method moves to step 390.

In step 390 it is determined whether a check condition is met. In some embodiments, the check condition may be determining whether the current iteration number k is a predetermined value, such as k=100 i.e. determining whether a predetermined number of iterations have been performed. Whilst this check is computationally easy, it takes no account of the accuracy of the image data. Therefore, in some embodiments, the check condition compares a current estimate of the diffraction pattern against that recorded by the detector 50. The comparison may be made considering a sum squared error (SSE) as in equation 7:

$$SSE = \frac{(|\Psi_j(u)|^2 - I_{s(j)}(u))^2}{N}  \quad \text{Equation 7}$$

Where N is a number of pixels in the array representing the wave function. The method may end when the SSE meets one or more predetermined criteria, such as being below a predetermined value.

If the predetermined criteria is not met, then the method moves to step 395 in preparation for a next iteration (k=k+1) where the probe position is reset i.e. the first probe position is reselected, such as j=1.

As explained above, during each iteration a plurality of probe positions are considered. Each probe position may not always correspond exactly to a pixel in the matrix that represents the image of the object O(r). For example, the probe does not always move a distance corresponding to an exact pixel position of the matrix that represents the image O(r) i.e. it may move to a position in between pixel locations. The matrix that represents the image O(r) has a pixel pitch of 1.5 μm, whereas the probe position may be moved at a resolution as low as, for example 0.1 μm and be arranged to move between 30 μm grid positions with a random offset between ±5 μm. Therefore it will be appreciated that the probe may move to a location in-between pixel locations of the matrix that represents the image O(r). In order to improve convergence of the estimated diffraction pattern with that measured by the detector 50, some embodiments of the invention include a compensation for sub-pixel shifting of the probe location, as will be explained.

In order to include sub-pixel shift compensation for the probe function $P_j(r)$, prior to the exit wave function estimate $\psi_j(r)$ being determined in step 320 by multiplication of the current probe and object functions, the sub-pixel shifting of the probe function is considered. In some embodiments, a linear phase ramp $\phi_j(u)$ is added to a transform of the current probe function $P_j(r)$. The transform may be a Fourier transform of the probe function.

The linear phase ramp $\phi_j(u)$ is, in some embodiments, determined by considering the distance of the probe function from a nearest pixel position of the matrix representing the object O(r) by Equation 8:

$$\phi_j(u) = -2\pi\left(\frac{s_{(x,j)}u}{cM} + \frac{s_{(y,j)}v}{cN}\right)  \quad \text{Equation 8}$$

Where c is a constant value, for example c may equal 4 and M and N are the number of rows and columns of pixels in the rectangular detector 50. u=[u, v] is a 2-dimensional vector with components u and v. $s_{(x, j)}$ is the distance of the probe function in the direction x from the nearest pixel position in the matrix representing the object O(r) and $s_{(y, j)}$ is the distance of the probe function in the direction y from the nearest pixel position in the matrix representing the object O(r).

Following the addition of the phase ramp, the resultant probe function is inversely transformed and multiplied with the current object function to produce the current exit wave $\psi_j(r)$.

In embodiments compensating for sub-pixel shifting of the detector, the updating of the object function is performed by Equation 9:

$$O_{j+1}(r) = Oj(r) + \alpha \frac{P_j^*(r - [s_{(x,j)}, s_{(y,j)}])}{|P_j(r - [s_{(x,j)}, s_{(y,j)}])|_{max}^2}(\psi'_j(r) - \psi_j(r))  \quad \text{Equation 9}$$

and the updating of the probe function in step 370 is performed by Equation 10

$$P_{j+1}(r - [s_{(x,j)}, s_{(y,j)}]) = \quad \text{Equation 10}$$
$$P_j(r - [s_{(x,j)}, s_{(y,j)}]) + \beta \frac{O_j^*(r)}{|O_j(r)|_{max}^2}(\psi'_j(r) - \psi_j(r))$$

Following updating of the probe function, a conjugated linear phase ramp $-\phi_j(u)$ is applied to the transform of the updated probe function, in the same way as it was applied. In some embodiments, applying the conjugated phase ramp and the application of the next sub-pixel shift to the following probe position may be combined to avoid excessive transforms of the probe function.

Figure 5:
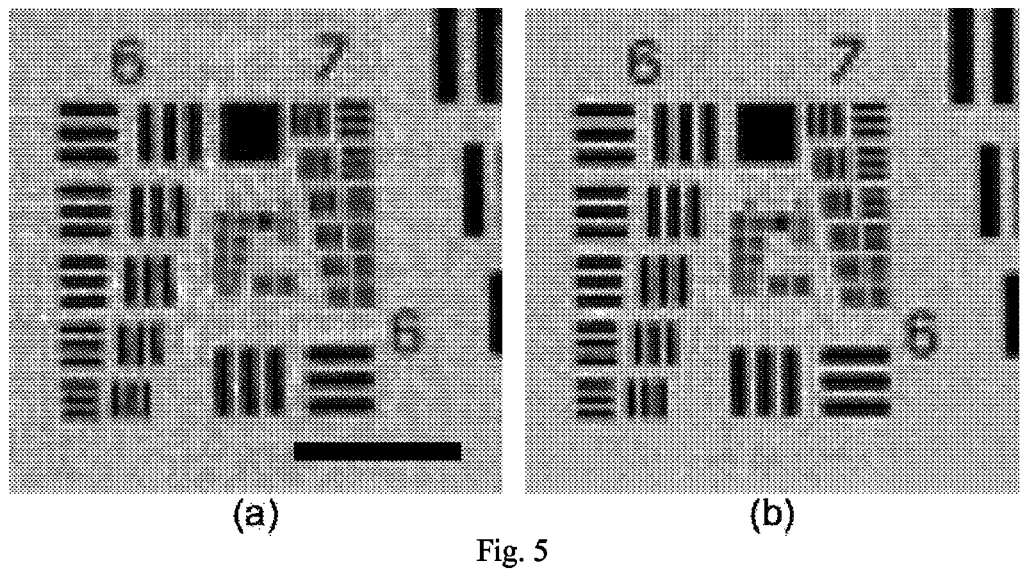
FIG. 5 shows images generated from image data produced by embodiments of the invention.

FIG. 5 shows the effect of considering the sub-pixel shift of the probe. FIG. 5(*a*) shows an image produced from image data resulting from 150 iterations of the ePIE method disclosed in WO 2010/064051 without including sub-pixel shifting of the probe. FIG. 5(b) shows an image produced from image data of the same target object from 150 iterations of the ePIE method according to an embodiment of the invention including the effect of sub-pixel shifting of the probe. It can be observed that by including the effect of sub-pixel shifting of the probe noise in the image data is decreased and a resolution of the image data is increased. The scale bar shown in the image is 100 μm long.

Figure 6:
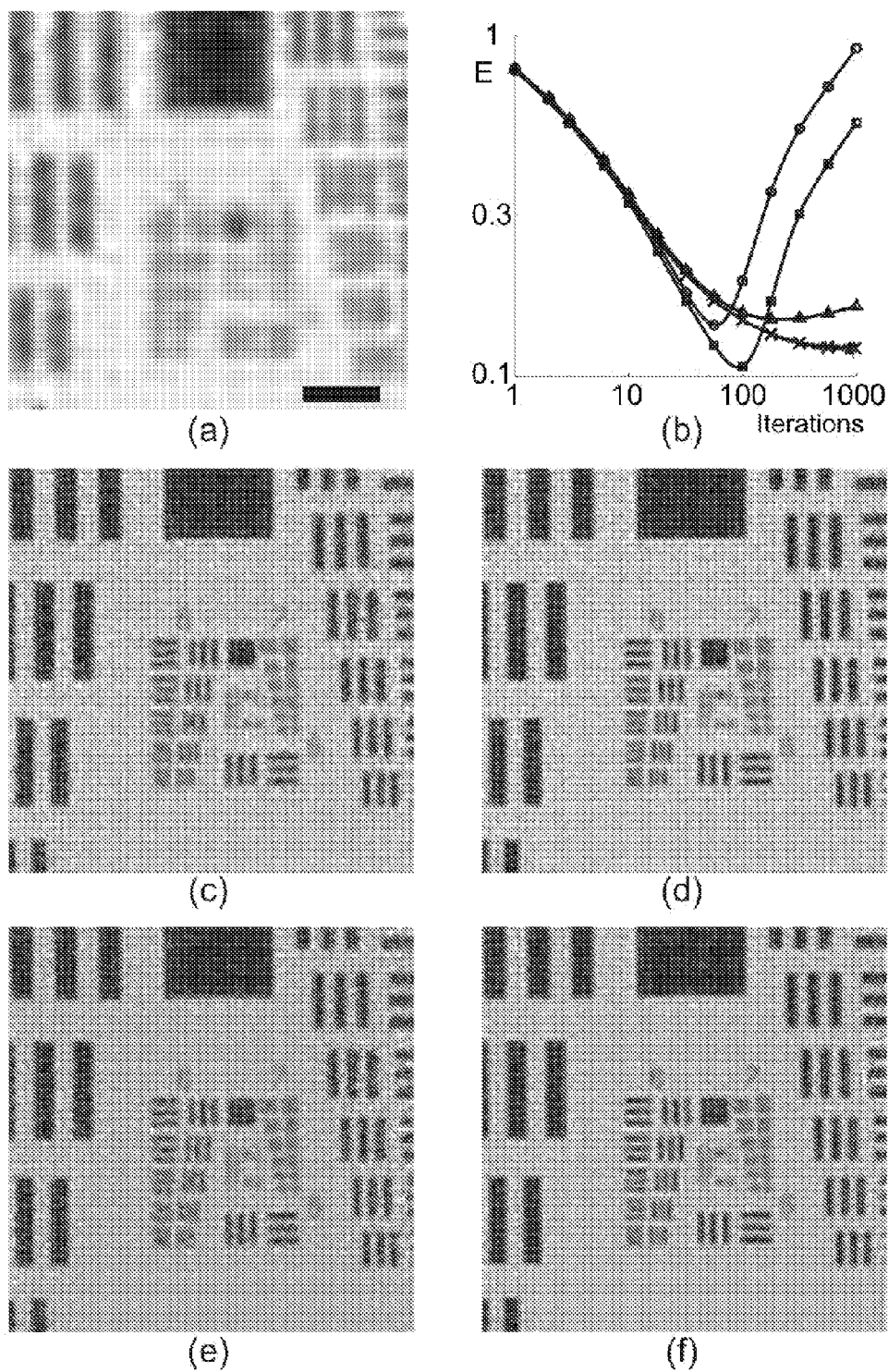
FIG. 6 shows further images generated from image data produced by embodiments of the invention.

FIG. 6 illustrates an improvement in resolution of image data produced by embodiments of the present invention. FIG. 6(a) is an image produced from image data based upon a central region of the diffraction pattern used to produce the images shown in FIG. 5. FIG. 6(a) is produced by the ePIE method disclosed in WO 2010/064051. The finest resolved features are in group 5, element 2 having a resolution of 36 line-pairs/mm (lp/mm), which is consistent with a spatial frequency extent of the detector used (33 lp/mm). FIG. 6(b) illustrates an error metric which compares an extrapolated region of a diffraction pattern, i.e. that outside of the detector, compared to recorded diffraction pattern intensity according to equation 11:

$$E = \frac{\sum_{j=1}^{J} \sum_{u} S(u) \left| \sqrt{I_{s(j)}(u)} - |\Psi_j(u)| \right|^2}{\sum_{j=1}^{J} \sum_{u} S(u) I_{s(j)}(u)}$$ Equation 11 where S(u) is 1 in the extrapolated region of the diffraction patterns and 0 on their constrained border and in the area where measured data was used.

FIG. 6(c) is an image based on image data produced by an embodiment of the present invention without high spatial frequency restriction, i.e. no clamping of a border region, and without sub-pixel shifting of the probe. The corresponding error metric is indicated in FIG. 6(b) with circles.

FIG. 6(d) is an image based on image data produced by an embodiment of the present invention without high spatial frequency restriction, i.e. no clamping of a border region, but with sub-pixel shifting of the probe. The corresponding error metric is indicated in FIG. 6(b) with squares.

FIG. 6(e) is an image based on image data produced by an embodiment of the present invention with high spatial frequency restriction, i.e. including clamping of a border region, but without sub-pixel shifting of the probe. The corresponding error metric is indicated in FIG. 6(b) with triangles.

FIG. 6(f) is an image based on image data produced by an embodiment of the present invention with both high spatial frequency restriction and sub-pixel shifting of the probe. The corresponding error metric is indicated in FIG. 6(b) with crosses.

All embodiments of the invention performed 1000 iterations of the respective method to produce the image data on which FIGS. 6(c)-(f) are based. As can be noted from FIG. 6(b) by using both the high spatial frequency constraint and sub-pixel shifting the error does not diverge. In all cases, the resolution of the image data is improved over that shown in FIG. 6(a). The increase in resolution for the exemplary image data is around 2.24 from 36 to 80.6 lm/mm. As can be appreciated from FIG. 6(c) which includes neither high spatial frequency constraint nor sub-pixel shifting, considerable noise is present which is due to Fourier repeats. A similar degree of noise is present in FIG. 5(d) which includes sub-pixel shifting, although the clarity of this image is improved due to the sub-pixel shifting. FIGS. 5(e) and (f) show how constraining the border of the diffraction pattern significantly reduces the noise, with FIG. 6(f) showing reduced noise and improved clarity.

Figure 7:
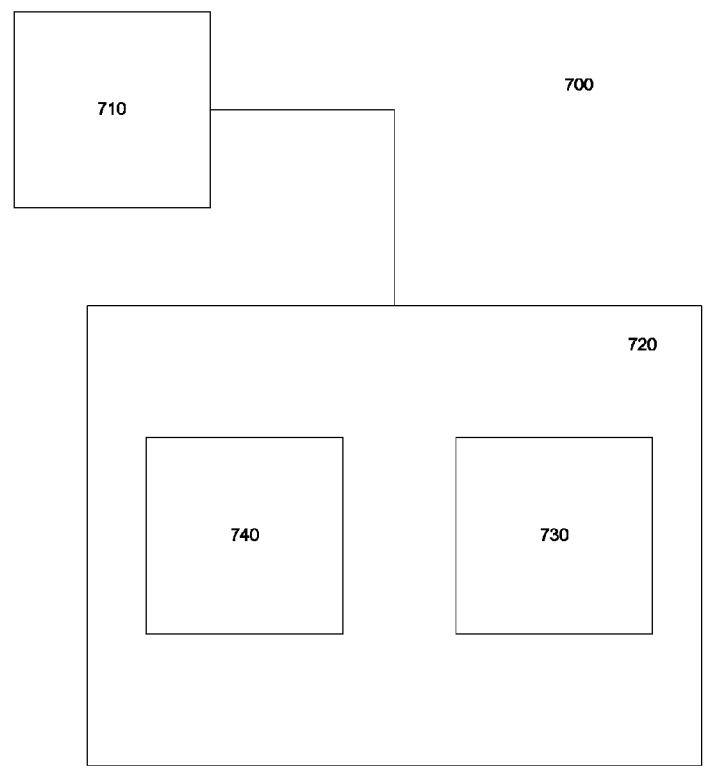
FIG. 7 illustrates an apparatus according to an embodiment of the invention.

FIG. 7 illustrates an apparatus 700 according to an embodiment of the invention. The apparatus 700 is arranged to determine image data for an object. The image data may, in some embodiments, be used to generate a visible image of the object. The visible image may, for example, be output to a display device.

The apparatus 700 comprises a detector 710 for detecting an intensity of radiation falling thereon. The detector 710 corresponds to the detector 50 shown in FIG. 1 arranged to record a diffraction pattern formed by radiation scattered by the target object. The detector may comprise a plurality of detecting elements each capable of outputting a signal indicative of the intensity of radiation falling thereon. The detector may be a CCD device, or similar. The detector 710 is communicably coupled to a processing unit 720 which is arranged to determine the image data based on the radiation intensity detected by the detector 710. The processing unit 720 comprises a memory 730 and a data processor 740, such as a CPU. Although FIG. 7 shows the processing unit 720 comprising one memory, the processing unit 720 may comprise two or more memories. Furthermore, although shown as comprising one data processor, the processing unit 720 may comprise more than one data processor 740, and each data processor may comprise one or more processing cores. The memory 730 may be arranged to store measured radiation intensity data $I_{s(j)}(u)$ corresponding to a plurality of probe positions. The data processor 740 may implement a method according to an embodiment of the invention, such as that shown in FIG. 3 and previously described. The data processor may store determined image data in the memory 730.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of providing image data for constructing an image of a region of a target object, comprising:
   providing incident radiation from a radiation source at a target object;
   detecting, by at least one detector, a portion of radiation scattered by the target object; and
   providing image data via an iterative process responsive to the detected radiation, wherein said iterative process comprises estimating a wave front of scattered radiation at a plane of the detector, updating a portion of the wave front based on the detected radiation, leaving a portion of the estimated wave front substantially unchanged, setting a portion of the wave front, corresponding to a portion of radiation scattered by the target object and not detected by the detector, to one or more values, and providing image data based upon the updated wave front.

2. The method of claim 1, wherein the detecting step comprises detecting a portion of radiation scattered by the target object with the incident radiation or an aperture at first and second positions.

3. The method of claim 1, wherein the portion of the estimated wave front substantially unchanged is relatively larger than the portion of the wave front set to one or more values.

4. The method of claim 1, wherein the one or more values comprise predetermined values.

5. The method of claim 1, wherein the one or more values comprise values determined according to one or more functions.

6. The method of claim 1, wherein the portion of the wave front corresponding to the portion of radiation scattered by the target object and not detected by the detector is a peripheral region of at least a part of the wave front.

7. The method of claim 6, wherein the peripheral region extends a plurality of pixels into the wave front.

8. The method of claim 1, further comprising:
   estimating at least one of an object function indicating at least one characteristic of at least a region of the target object and a probe function indicating at least one characteristic of incident radiation at the target object or the aperture;
   estimating the wave front at the plane of the at least one detector based on the object function and the probe function.

9. The method of claim 1, wherein the updating of the portion of the wave front comprises updating a modulus of the wave front according to the detected radiation.

10. The method of claim 1, wherein the portion of the estimated wave front is updated based on the detector radiation according to:

$$\sqrt{I_{s(j)}(u)}$$

where $I_{s(j)}(u)$ is a detected intensity of radiation for a probe position j.

11. The method of claim 1, wherein the updated portion of the wave front based on the detected radiation is generally centrally located.

12. The method of claim 1, comprising determining an ordering of the positions of the incident radiation or the aperture for the measurements of the portion of scattered radiation to be used in the iterative process.

13. The method of claim 12, wherein the determined ordering is random or pseudo-random.

14. The method of claim 12, wherein the ordering is a non-sequential pattern.

15. The method of claim 2, comprising determining a value of a sub-pixel shift of the incident radiation or the aperture between the first and second positions.

16. The method of claim 15, comprising applying a phase ramp to a transform of the probe function based on the sub-pixel shift value.

17. The method of claim 1, comprising causing radiation scattered by the target object to extend beyond an aperture of the at least one detector.

18. The method of claim 17, wherein the causing comprises arranging a diffuser to interact with the radiation, such that the scattered radiation extends beyond an aperture of the at least one detector.

19. The method of claim 18, wherein the diffuser is arranged in a path of the radiation pre-target or in a path of the scattered radiation.

20. An apparatus for providing image data for constructing an image of a region of a target object, comprising:
   at least one detector for detecting an intensity of radiation scattered by the target object; and
   a processing means arranged to provide image data via an iterative process responsive to the detected radiation wherein said iterative process comprises estimating a wave front of scattered radiation at a plane of the detector, updating a portion of the wave front based on the detected radiation, leaving a portion of the estimated wave front substantially unchanged, setting a portion of the wave front, corresponding to a portion of radiation scattered by the target object and not detected by the detector, to one or more values, and providing image data based upon the updated wave front.

21. The apparatus of claim 20, comprising means for moving incident radiation or an aperture between at least first and second portions.

22. The apparatus of claim 20, wherein the one or more values comprise values determined according to one or more functions.

23. The apparatus of claim 20, wherein the one or more values comprise predetermined values.

24. The apparatus of 20, wherein the portion of the wave front corresponding to the portion of radiation scattered by the target object and not detected by the detector is a peripheral region of at least a part of the wave front.

25. The apparatus of claim 20, further wherein the processing means is arranged to:
   estimate at least one property of an object function indicating at least one characteristic of at least a region of the target object and/or a probe function indicating at least one characteristic of incident radiation at the target object or the aperture;
   estimating the wave front at the plane of the at least one detector based on the object function and the probe function.

26. The apparatus of claim 20, wherein processing means is arranged to update a modulus of the portion of the wave front according to the detected radiation.

27. The apparatus of claim 26, wherein the portion of the wave front is replaced with:

$$\sqrt{I_{s(j)}(u)}$$

where $I_{s(j)}(u)$ is a detected intensity of radiation for a probe position j.

28. The apparatus of claim 20, wherein the updated portion of the wave front based on the detected radiation is generally centrally located.

29. The apparatus of claim 20, comprising a diffuser arranged to interact with the radiation, such that the scattered radiation extends beyond an aperture of the at least one detector.

30. The apparatus of claim 29, wherein the diffuser is arranged in a path of the radiation pre-target or in a path of the scattered radiation.

* * * * *